US009829970B2

(12) United States Patent
Ellis et al.

(10) Patent No.: US 9,829,970 B2
(45) Date of Patent: Nov. 28, 2017

(54) SYSTEM FOR SWITCHING DISPLAYS BASED ON THE VIEWING DIRECTION OF A USER

(75) Inventors: Richard Ellis, Basingstoke (GB); Clare Owens, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 13/169,930

(22) Filed: Jun. 27, 2011

(65) Prior Publication Data

US 2012/0326945 A1 Dec. 27, 2012

(51) Int. Cl.
*G09G 5/00* (2006.01)
*G06F 3/01* (2006.01)
*G06F 3/14* (2006.01)

(52) U.S. Cl.
CPC ............ *G06F 3/013* (2013.01); *G06F 3/1423* (2013.01); *G09G 2354/00* (2013.01)

(58) Field of Classification Search
CPC ............................................ G06F 3/011–3/013
USPC ......................................................... 345/1.1
See application file for complete search history.

(56) References Cited

U.S. PATENT DOCUMENTS

| | | | | |
|---|---|---|---|---|
| 5,682,529 | A * | 10/1997 | Hendry | G06F 3/14 710/16 |
| 6,437,758 | B1 * | 8/2002 | Nielsen et al. | 345/8 |
| 6,526,159 | B1 * | 2/2003 | Nickerson | 382/117 |
| 6,573,913 | B1 * | 6/2003 | Butler | G06F 3/1423 345/1.1 |
| 6,717,556 | B2 * | 4/2004 | Asahi | G09G 5/14 345/1.1 |
| 6,859,219 | B1 * | 2/2005 | Sall | G06F 1/1607 345/1.1 |
| 2003/0151562 | A1 * | 8/2003 | Kulas | 345/1.1 |
| 2004/0240708 | A1 * | 12/2004 | Hu et al. | 382/103 |
| 2008/0084471 | A1 | 4/2008 | Yabuta et al. | |
| 2008/0115151 | A1 * | 5/2008 | Rajpal | H04M 1/72522 719/320 |
| 2009/0102990 | A1 | 4/2009 | Walton et al. | |
| 2009/0196460 | A1 | 8/2009 | Jakobs et al. | |
| 2011/0037711 | A1 * | 2/2011 | Siddiqui | G06F 3/1423 345/173 |
| 2012/0081323 | A1 * | 4/2012 | Sirpal | G06F 1/1616 345/173 |
| 2012/0182210 | A1 * | 7/2012 | Chan et al. | 345/156 |
| 2012/0218398 | A1 * | 8/2012 | Mehra | 348/78 |

(Continued)

*Primary Examiner* — Dorothy Harris
(74) *Attorney, Agent, or Firm* — Steven M. Greenberg, Esq.; CRGO Law

(57) ABSTRACT

Embodiments of the present invention provide a method, system, and computer program product for automatically assigning a display as a primary display in a multi-display computer. In an embodiment of the invention, a method for configuring a primary display in a multi-display environment is provided and can include tracking eye movements of an end user interacting with a multi-display computer. A display principally viewed by the end user, can be identified based upon the eye movements amongst at least two displays of the multi-display computing environment. Thereafter, the identified display can be configured as a primary display in the multi-display computing environment in response to determining that the end user has viewed the identified display for a threshold period of time.

12 Claims, 3 Drawing Sheets

(56) References Cited

U.S. PATENT DOCUMENTS

2012/0219180 A1* 8/2012 Mehra .................. G06F 3/013
                                                    382/103
2012/0272179 A1* 10/2012 Stafford ...................... 715/781

* cited by examiner

SYSTEM FOR SWITCHING DISPLAYS BASED ON THE VIEWING DIRECTION OF A USER

BACKGROUND OF THE INVENTION

Field of the Invention

The present invention relates to displays and more particularly to multi-display computers.

Description of the Related Art

Computers customarily are sold with a single display. Recently, with the advancement of liquid crystal display (LCD) technology in flat panel displays that consume a small physical footprint, and the relative affordability of flat panel displays, end users have coupled multiple different displays to a single computer through a multi-display adapter. While each individual display can display an identical image of the same desktop, many opt to drive the display adapter to cause the display of the desktop computing environment across the aggregation of the multi-display environment. Consequently, in the latter circumstance, each display can show only a designated portion of the desktop computing environment.

A multi-head video card provides the requisite circuitry for driving multiple displays in a multi-display environment. Most, if not all, current multi-head video cards are able to "span" a single frame buffer across two monitors. The result is one large rectangular desktop space where both monitors operate at the same resolution and depth settings and usually the same refresh rate. In "extended" mode additional desktop area is created by giving each monitor its own frame buffer. The result is a virtual desktop space comprising multiple adjacent, but not necessarily aligned, rectangular areas. This is a more flexible configuration as each monitor can be of different resolution, depth, and refresh rate. In addition, the desktop area is not necessarily rectangular. Both "span" and "extended" mode present the display space to a user as a contiguous area, allowing objects to be moved between or even straddled across displays as if they were one.

Of note, in a multi-display environment, one display is configured to be the primary display in which applications are initially displayed when launched and the remaining displays are secondary displays. Once configured, the expansive display space afforded by a multi-display environment allows a user to leave the display windows of multiple different documents or programs visible in the different displays as opposed to requiring the end user to minimize unused windows and to maximize actively used window because of lack of viewable space when only one display is used. In addition, in a multi-display environment, end users have come to logically associate one display for one purpose, for instance displaying email, and another display can be used for another purpose, such as displaying a work document. Accordingly, substantial work efficiencies can be achieved through the use of a multi-display environment.

Even still, the use of a multi-display environment is not without its cost. In a multi-display environment, the end user must adjust the video settings of each display. Manually configuring the multi-display environment including selecting a primary display via a video driver for the multi-head video adapter can be cumbersome for less sophisticated end users, however.

BRIEF SUMMARY OF THE INVENTION

Embodiments of the present invention address deficiencies of the art in respect to the assignment of a primary display on a multi-display computer and provide a novel and non-obvious method, system, and computer program product for automatically assigning a display as a primary display in a multi-display computer. In an embodiment of the invention, a method for configuring a primary display in a multi-display environment is provided and can include tracking eye movements of an end user interacting with a multi-display computer. A display principally viewed by the end user, can be identified based upon the eye movements amongst at least two displays of the multi-display computing environment. Thereafter, the identified display can be configured as a primary display in the multi-display computing environment in response to determining that the end user has viewed the identified display for a threshold period of time.

Another embodiment of the invention provides for a data processing system configured for configuring a primary display in a multi-display computing environment. The system can include a computer having at least one processor and memory, a multi-display adapter coupled to the computer, at least two displays driven by the adapter and an eye tracking system coupled to the adapter. The system additionally can include a primary display configuration module executing in memory of the computer. The module can include program code enabled to track eye movements of an end user through the eye tracking system to identify a display amongst the displays principally viewed by the end user, and to configure the identified display as a primary display in the computer.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for assigning a display as a primary display in a multi-display computer. In accordance with an embodiment of the invention, the eye movements of the end user using a multi-display computer can be monitored in a multi-display computer to assign a primary display automatically according to the direction in which the end user gazes rather than require the end user to manually adjust the video adapter configuration of the multi-display environment. Importantly, by providing the automatic configuration of a primary display in the multi-display environment, the end user need not manually designate a primary display at each change of working mode, especially, for instance, when the mode of working for the end user switches from a disconnected single display laptop mode to a docked laptop mode in a multi-display environment. Once the primary display has been configured for the multi-display environment, the eye movements of the end user can continue to be monitored if the assigned primary display remains the primary display of the end user. When a threshold period of time passes during which the primary display no longer is viewed by the end user, a different display can be assigned as the new primary display according to the direction in which the end user gazes. In this way, the configuration of primary display in the multi-display environment can automatically adjust over time.

Figure 1:
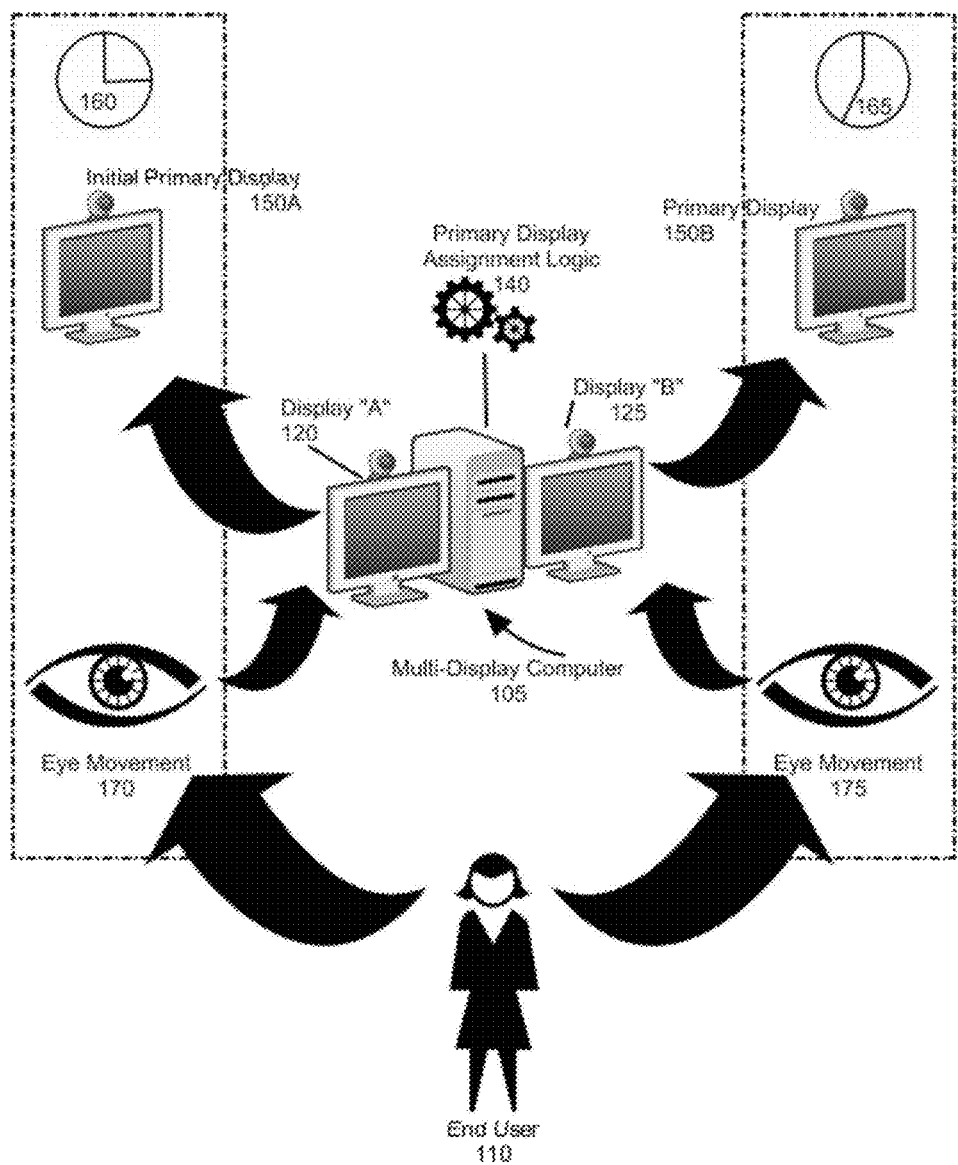
FIG. 1 is a pictorial illustration of a process for assigning a primary display in a multi-display computer.

In further illustration, FIG. 1 pictorially shows a process for assigning a primary display 150A, 150B in a multi-display computer 105. As shown in FIG. 1, an end user 110 begins to view a multi-display computer 105 having multiple displays, such as display "A" 120 and display "B" 125. The eye movements 170, 175 of the end user 110 can be tracked by primary display assignment logic 140 to identify that the end user 110 is initially interacting with one display, such as display "A" 120. As such display "A" 120 can be identified as the initial primary display 150A beginning at some initial time 160.

In one instance, data from available cameras, such as webcams, located in either or both of the multiple displays, including display "A" 120 or display "B" 125, can be used by the primary display assignment logic 140 to track the eye movement 170, 175 of the end user 110 so that an initial primary display 150A can be identified. Of note, a camera can be located in each, some, or all displays of a multi-display computer 105. Of note, the multi-display computer 105 can include both one computer processing unit (CPU) coupled to at least two displays or to a multiple of CPUs each coupled to at least one display which are coupled together to form one multi-display computer, Upon display "A" 120 being identified as the initial primary display 150A, primary display assignment logic 140 can poll the camera in any display, such as display "A" 120 or display "B" 125, to identify if display "A" 120 continues to be the display the end user 110 is interacting with. Primary display assignment logic 140 can update its assignment of either display as the primary display 150B, if after the primary display assignment logic 140 polls the camera and establishes that display "B" 125 has been in use for more than a set threshold of time 165, for instance two minutes. The time threshold 165 is not limited to a specific value; in addition, it can be specified by the end user 110 or hard coded as part of the primary display assignment logic 140.

Figure 2:
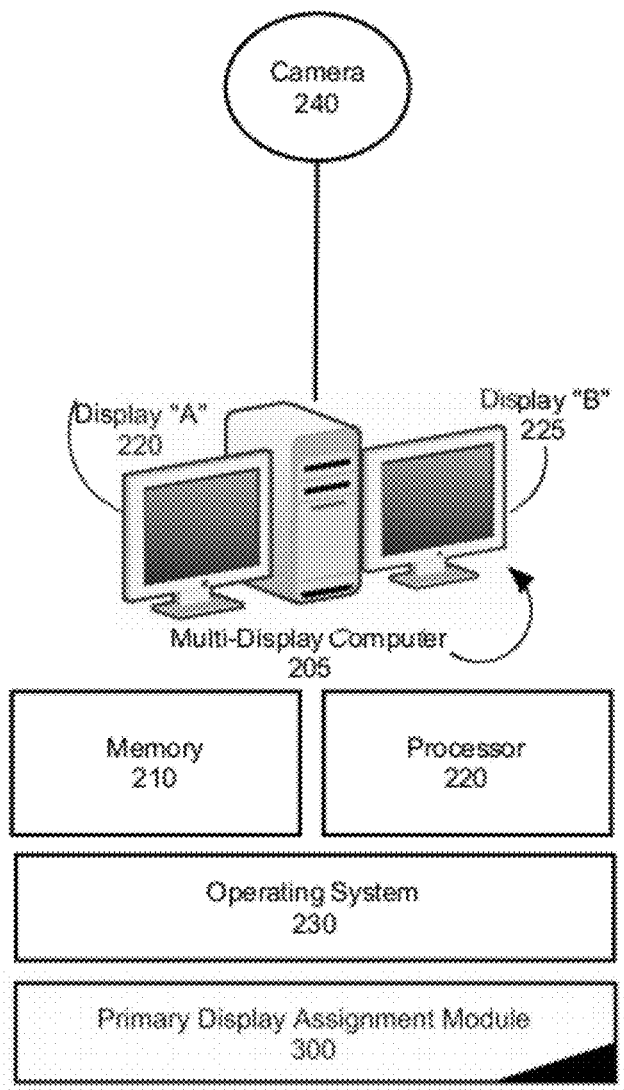
FIG. 2 is a schematic illustration of a data processing system configured for assigning a primary display in a multi-display computer; and, FIG. 3 is a flow chart illustrating a process for assigning a primary display in a multi-display computer.

The process described in connection with FIG. 1 can be implemented in a multi-display data processing system as shown in FIG. 2. Specifically, FIG. 2 schematically shows a data processing system configured for assigning a primary display in a multi-display computer. A primary display assignment system can include a multi-display computer 205 having at least two displays, for instance display "A" 220 and display "B" 225. The multi-display computer 205 can include at least one processor 250 and memory 210 supporting the execution of an operating system (O/S) 230. The O/S 230 in turn can support at least one camera 240 and a primary display assignment module 300.

The primary display assignment module 300 can include program code when executed by at least one processor 250 of the multi-display computer 205, tracks eye movements of an end user interacting with a multi-display computer. In one instance, data from a camera 240 coupled with at least one display of a multi-display computer 205 can be used to track the eye movements of the end user. The primary display assignment module 300 can further include program code to identify, based upon the eye movements of the end user, a display principally viewed by the end user amongst at least two displays, such as display "A" 220 and display "B" 225, of the multi-display computer 205. The primary display assignment module 300 can then establish the identified display as a primary display in the multi-display computer 205 in response to determining that the end user has viewed the identified display for a threshold period of time. The threshold period of time is not limited to a specific value; in addition, it can be specified by the end user or hard coded as part of the primary display assignment module 300. Optionally, displays other than the primary display can be deactivated, thus, energy and reducing the complexity and overhead of the multi-display computer of the end user.

Figure 3:
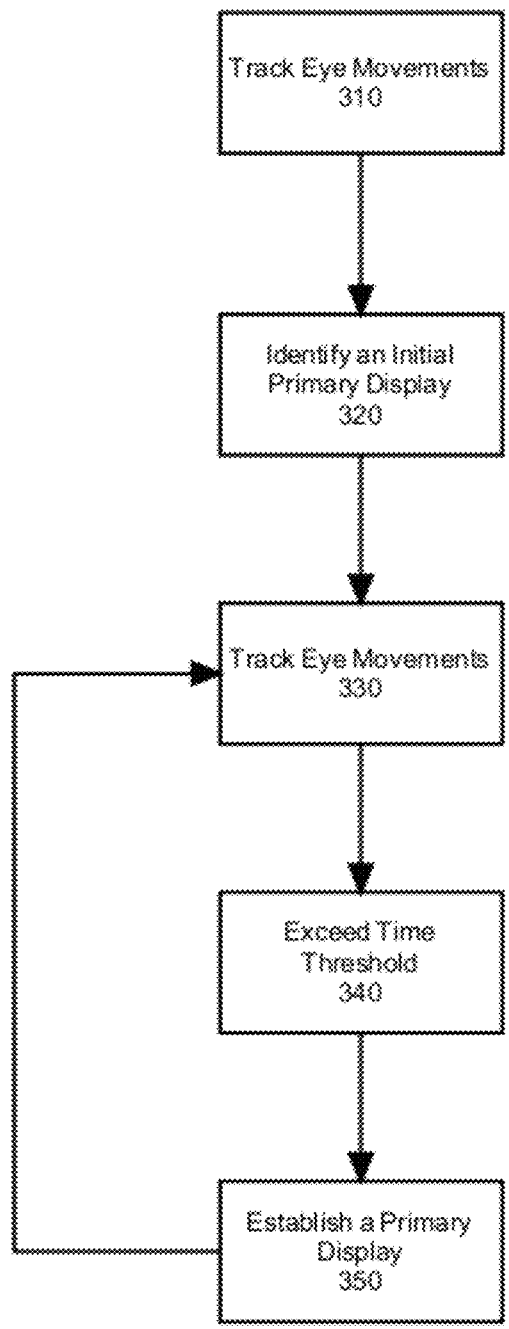

In even yet further illustration of the operation of the program code in the primary display assignment module 300, FIG. 3 is a flow chart illustrating a process for assigning a primary display in a multi-display computer. Beginning in step 310, eye movements of an end user can be tracked using data from at least one camera in a multi-display computer. An initial primary display is identified amongst the displays in a multi-display computer based upon the eye movements of the end user, as indicated in step 320. In step 330, the eye movements of the end user can again be tracked based on the data from at least one camera in the multi-display computer to determine if the initial primary display is still the current display in use. A determination can then be made as to whether a time threshold has been exceeded with respect to how long the current primary display has been in use, as indicated in step 340. If the time threshold has been exceeded and the current display is not the same as the initial primary display, then the current display can be established as the primary display, as indicated in step 350. Optionally, displays other than the primary display can be deactivated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method of configuring a display as a primary display in a multi-display computing environment, the method comprising:
    monitoring a mode of working in laptop computer with a single display;
    detecting when the mode changes from disconnected display mode to a docked display mode; and, responsive to detecting a mode change from disconnected to docked,
   configuring a multi-display environment of different displays including the single display of the laptop computer, with different display windows of a desktop of an operating environment being visible in the different ones of the different displays,
   initially setting the single display of the laptop computer in the multi-display environment to have a primary status in which applications launched in the laptop computer are initially displayed while setting others of the displays of the multi-display computing environment to have a secondary status in which applications launched in the laptop computer are not initially displayed,
   tracking eye movements of an end user interacting with the different displays of the multi-display computing environment,
   identifying based upon the eye movements, a display having a secondary status principally viewed by the end user, and
   on condition that a threshold time has elapsed since the end user has viewed the single display, assigning display with secondary status have primary status according to a direction in which the end user gazes, and re-configuring the single display of the laptop computer to have secondary status.

2. The method of claim 1, further comprising deactivating ones of the displays with secondary status.

3. The method of claim 1, wherein tracking eye movements of an end user interacting with the different displays comprises using data from at least one camera coupled to at least one of the different displays.

4. The method of claim 1, further comprising:
   subsequent to the assignment of the display with secondary status to have primary status, configuring another of the displays with secondary status to have primary status in response to identifying based upon the eye movements that the another of the displays has become a display amongst the different displays principally viewed by the end user.

5. A multi-display computer data processing system comprising:
   a laptop computer having at least one processor and memory and a single display;
   a multi-display adapter coupled to the laptop computer;
   multiple displays external to the laptop computer that are driven by the adapter;
   an eye tracking system coupled to the adapter; and,
   a primary display configuration module executing in memory of the laptop computer, the module comprising program code enabled to monitor a mode of working in the laptop computer;
   detect when the mode changes from disconnected display mode to a docked display mode; and,
   respond to detecting a mode change from disconnected to docked by,
      configuring a multi-display environment of different displays including the single display of the laptop computer, with different display windows of a desktop of an operating environment being visible in the different ones of the different displays,
      initially setting the single display of the laptop computer in the multi-display environment to have a primary status in which applications launched in the laptop computer are initially displayed while setting others of the displays of the multi-display computing environment to have a secondary status in which applications launched in the laptop computer are not initially displayed,
      tracking eye movements of an end user interacting with the different displays of the multi-display computing environment,
      identifying based upon the eye movements, a display having a secondary status principally viewed by the end user, and
      on condition that a threshold time has elapsed since the end user has viewed the single display, assigning display with secondary status have primary status according to a direction in which the end user gazes, and re-configuring the single display of the laptop computer to have secondary status.

6. The system of claim 5, wherein ones of the displays with secondary status are deactivated.

7. The system of claim 5, wherein tracking eye movements of an end user interacting with the different displays comprises using data from at least one camera coupled to at least one of the different displays.

8. The system of claim 5, wherein subsequent to the assignment of the display with secondary status to have primary status, configuring another of the displays with secondary status to have primary status in response to identifying based upon the eye movements that the another of the displays has become a display amongst the different displays principally viewed by the end user.

9. A computer program product for configuring a display as a primary display in a multi-display computing environment, the computer program product comprising a computer readable storage medium having program instructions embodied therewith, wherein the computer readable storage medium is not a transitory signal per se, the program instructions executable by a device to cause the device to perform a method comprising:
   monitoring a mode of working in laptop computer with a single display;
   detecting when the mode changes from disconnected display mode to a docked display mode; and,
   responsive to detecting a mode change from disconnected to docked,
      configuring a multi-display environment of different displays including the single display of the laptop computer, with different display windows of a desktop of an operating environment being visible in the different ones of the different displays,
      initially setting the single display of the laptop computer in the multi-display environment to have a primary status in which applications launched in the laptop computer are initially displayed while setting others of the displays of the multi-display computing environment to have a secondary status in which applications launched in the laptop computer are not initially displayed,
      tracking eye movements of an end user interacting with the different displays of the multi-display computing environment,
      identifying based upon the eye movements, a display having a secondary status principally viewed by the end user, and
      on condition that a threshold time has elapsed since the end user has viewed the single display, assigning display with secondary status have primary status according to a direction in which the end user gazes, and re-configuring the single display of the laptop computer to have secondary status.

10. The computer program product of claim 9, wherein the method further comprises deactivating ones of the displays with secondary status.

11. The computer program product of claim 9, wherein tracking eye movements of an end user interacting with the different displays comprises using data from at least one camera coupled to at least one of the different displays.

12. The computer program product of claim 9, wherein the method further comprises:
   subsequent to the assignment of the display with secondary status to have primary status, configuring another of the displays with secondary status to have primary status in response to identifying based upon the eye movements that the another of the displays has become a display amongst the different displays principally viewed by the end user.

* * * * *